US005102716A

United States Patent [19]

Balmer et al.

[11] Patent Number: 5,102,716

[45] **Date of Patent: * Apr. 7, 1992**

[54] EMBOSSED AND WIPED DECORATIVE SURFACE COVERINGS

[75] Inventors: Richard H. Balmer, Manheim; Martin Dees, Jr., Landisville; Frank G. Drout, Lancaster, all of Pa.

[73] Assignee: Armstrong World Industries, Inc, Lancaster, Pa.

[*] Notice: The portion of the term of this patent subsequent to Jan. 8, 2008 has been disclaimed.

[21] Appl. No.: 605,079

[22] Filed: Oct. 29, 1990

Related U.S. Application Data

[63] Continuation of Ser. No. 231,366, Aug. 12, 1988, Pat. No. 4,983,443.

[51] Int. Cl.[5] .................................................. B32B 3/12

[52] U.S. Cl. .................................... 428/158; 428/120; 428/161; 428/163; 428/172; 428/306.6; 428/308.4; 428/318.4; 428/424.6; 428/515; 428/520; 428/542.2; 428/203; 428/204

[58] Field of Search ................. 428/33, 131, 133, 137, 428/46, 47, 119, 161, 167, 120, 168, 172, 173, 515, 542.2, 134, 141, 142, 156, 158, 424.6, 203, 163, 306.6, 308.4, 318.4, 520, 204

[56] References Cited

U.S. PATENT DOCUMENTS 4,983,443 1/1991 Balmer et al. ........................ 428/158

*Primary Examiner*—Ellis P. Robinson
*Assistant Examiner*—Donald J. Loney

[57] ABSTRACT

A surface covering product is disclosed which includes a layer of fused embossed PVC material on a substrate and a layer of transparent or translucent plastic material substantially covering the fused PVC layer and filling the embossed area of depression in the PVC layer. The surface covering product is made by applying the plastic material to the embossed surface of the PVC material and wiping off at least a portion of the plastic material. In one embodiment, a film of plastic material of substantial or minimal thickness remains on the fused PVC material. In another embodiment, the plastic material is completely wiped off the undepressed area of the fused granular material. The PVC material is preferably a granular material such as a stencil vinyl fine material. In one embodiment, the plastic material is a layer of minimal thickness substantially covering the stencil vinyl fine material.

19 Claims, 1 Drawing Sheet

EMBOSSED AND WIPED DECORATIVE SURFACE COVERINGS

Cross-Reference to Related Applications

The present application is a continuation-in-part application of commonly owned co-pending application Ser. No. 231,366, filed Aug. 12, 1988, now U.S. Pat. No. 4,903,443, and is related to U.S. Pat. No. 4,797,315, issued Jan. 10, 1989, and U.S. Pat. No. 4,816,318, issued Mar. 28, 1989, both of which are incorporated herein by reference. The related applications disclose one of the embodiments resulting from the present method, and a different method of making the embodiment.

Background of the Invention

The present invention relates to a surface covering product and a method of making such a surface covering product. In particular, the present invention relates to a surface covering product having a substrate; a first fused polyvinyl chloride (PVC) layer substantially covering the substrate; and a second layer of plastic material either embedded in and partially covering the first layer, or substantially covering the first layer and having a portion embedded in the first layer. Preferably, the portion of the second layer embedded in the first layer is a plurality of discrete protruding elements.

Chavannes et al., U.S. Pat. No. 2,587,594, discloses a process for making decorative plastic sheet-like articles. The resulting articles have a contrasting colored portion embedded in lower regions of a film. However, there is no teaching or suggestion of completely filling the lower regions of the film with the contrasting colored material.

Chavannes et al. also teaches a method of forming discrete contrasting colored portions on the higher regions of a film by applying the contrasting colored substance to an embossed carrier, doctoring off the high points of the carrier, forming at least one layer of film over the doctored carrier, fusing the film and contrasting colored material, and stripping the carrier. However, such a method results in contrasting discrete elements on the high portions of the film.

Young, U.S. Pat. No. 1,873,098, teaches a method of painting the grooves between the ribs of an automobile mat material. The grooves are filled with a paint containing a large percentage of volatile solvent, the mat material is doctored with a rubber blade and the paint permitted to dry. Since the paint contains a large percentage of volatile solvent, when it evaporates a film of desired thinness lays over the bottom and sides of the ribs.

Summary of the Invention

The invention is directed to a method of forming a surface covering product having a layer of fused PVC material and a layer of cured transparent or translucent, plastic material. The layer of plastic material has either at least one discrete element which extends into the layer of fused PVC material or a layer of plastic material substantially covering the layer of fused PVC material and having at least one discrete element extending into the layer of fused PVC material. Preferably, the second layer has a plurality of discrete geometric elements having substantially constant cross-section. More preferably, the elements are cylindrical-shaped which form a dot pattern design, rectangular or regular polygonal-shaped in cross-section or cross-bar shaped which form a grid pattern. When the second layer substantially covers the first layer, the discrete elements appear through the layer of plastic material. The plastic material may contain solid particles, such as quartz or pearlescent pigment, to give the surface covering a different decorative effect and improve wear characteristics.

The method includes: 1) forming a layer of PVC material, preferably granular material, on the surface of a substrate material, 2) fusing the PVC material, 3) embossing the PVC material to form a depressed area in the surface of the PVC material opposite the substrate, 4) applying a transparent or translucent plastic material to the surface of the PVC material whereby the depressed area is filled with the plastic material and the undepressed surface of the granular material is substantially covered with a film of the plastic material, 5 ) wiping off at least a portion of the film of plastic material, and 6) curing the plastic material.

Preferably, the PVC material is mechanically embossed to form a number of discrete depressions. The depth of the depressions is preferably about 80 to 90% of the thickness of the fused granular material and the depressions cover about 10 to 50% of the surface area of the PVC material. In one embodiment, it is preferred that the embossing mold does not bottom out. In another embodiment, it is preferred that the embossing mold bottom out. The PVC material may be simultaneously fused and embossed and the substrate may be removed. The plastic material on the surface of the PVC material between the depressed areas may be completely wiped off, or a film of minimal or substantial thickness may be left on the areas between the depressed areas.

Detailed Description of the Invention

Figure 1:
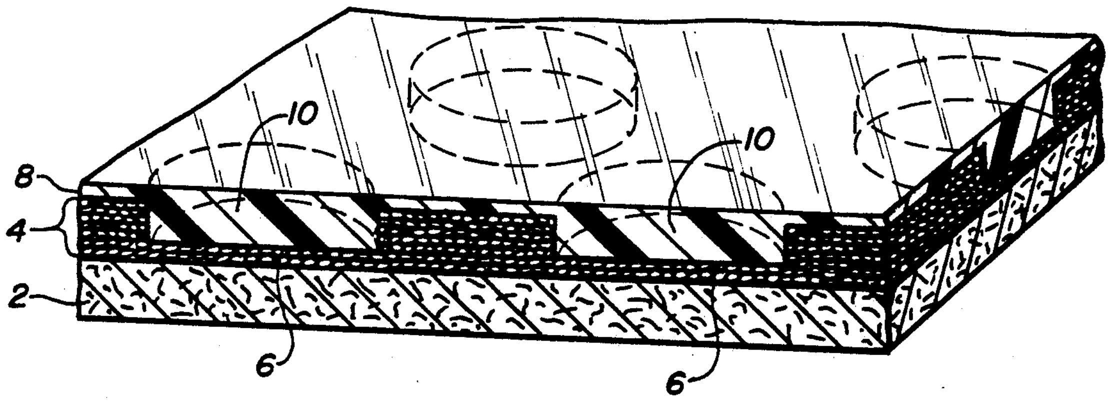
FIG. 1 shows a perspective view with a cross-sectional view of an embodiment of the present invention.

FIG. 1 shows one embodiment of the present invention which results from the method of the present invention. A substrate 2 is covered with a layer of fused PVC material 4. The PVC material may be a dry-blend formed by known methods of blending vinyl chloride resin particles such as polyvinyl chloride or vinyl chloride-vinyl acetate copolymers in a mixture with suitable quantities of plasticizers, stabilizers and blowing agents if desired, a stencil vinyl fine material, a liquid plastisol, or chips of fused plastisol. The layer of fused PVC material substantially covers the substrate and is bonded to the substrate. However, if a smear layer of plastisol is applied to the substrate before the PVC material is applied, the substrate may be a releaseable backing which may be removed after the PVC material has been fused. Areas of depression 6 are embossed, preferably by mechanical embossing, in the surface of the PVC material opposite the substrate.

A layer of transparent or translucent plastic material 8 substantially covers the layer of PVC material. The layer of plastic material has a substantial thickness between the areas of depression in the PVC material. Discrete elements 10 of plastic material fill the areas of depression in the PVC material.

Although discrete elements are shown, the layer of plastic material may be a single element such as would be formed if the embossed pattern were a single continuous depression creating discrete areas of raised PVC.

The term "element" is intended to include areas of increased thickness of the layer of plastic material which extends into the layer of fused PVC material. The cross-sectional area of the element or elements at their interface with the surface of the plastic material adjacent to the layer of PVC material may be greater than the cross-sectional area of the element or elements at a location spaced from the interface so that the element or elements are inverted domeshaped. Preferably, when the plastic material is substantially wiped off the areas between the depressions, the discrete elements have a substantially constant cross-sectional area so that the design pattern remains constant despite wearing away of the upper surface of the surface covering product.

Figure 2:
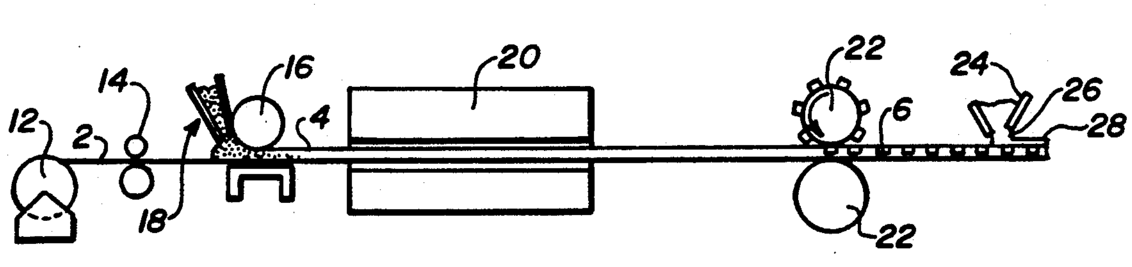
FIG. 2 shows a schematic drawing of equipment for practicing the method of the present invention.

Equipment for practicing the method of making the embodiment of FIG. 1 is shown in schematic form in FIG. 2. The substrate 2 is unwound from a roll 12. A roll coater 14 applies a three mil wet smear coat of plastisol. The screed roll 16 levels out the PVC material coating 4 which is deposited on the substrate by a means 18. The substrate and PVC material layer pass through the oven 20 to fuse the PVC material. The PVC layer is embossed at 22 to form areas of depression 6. The plastic material is applied with a squeegee 24. The excess material is wiped off at 26 and leaves a thin film 28. Thereafter, the plastic material is cured and bonded to the fused PVC material and the substrate may be removed.

Depending on the type of materials used, different types of equipment may be preferred. For example, a screed roll 16 has been used to level a dryblend to form the PVC material coating 4. However, a peg roller would be preferred if the PVC material is a stencil vinyl composition.

The step of fusing and embossing the PVC material may be combined into one step. Preferably, the dryblend PVC material is fused and then mechanically embossed to form discrete areas of depression.

When the PVC material is a stencil vinyl composition, it is preferred to sinter the granular PVC material prior to embossing it and fusing the granular material coating after the plastic material has been applied and wiped. By this procedure, the plastic material, particularly if it is a liquid plastisol which may be thixotropic or not, not only fills the depressed areas but also fills the interstices between the stencil vinyl fine material. When the PVC material is a stencil vinyl composition, it is important to deaerate the liquid plastisol.

In one preferred embodiment, only a portion of the plastic material on the areas of the PVC material between the depressed areas is wiped off so that a film of about 0.0001" to 0.020" covers the areas between the depressed areas. Preferably, the thickness of the plastic material is about 0.0001 or 0.005 inches.

Typically, the fused PVC layer has a maximum thickness of about 0.075" and preferably about 0.055". Typical felt backing has a thickness of about 0.030" resulting in a surface covering having a thickness of about 0.085" to 0.090".

In another preferred embodiment, the plastic material on the areas of the PVC material between the depressed areas is completely wiped off to form a decorative surface covering product similar to that described in U.S. Pat. No. 4,816,318. This embodiment results if the PVC material is a dryblend or plastisol which has been fused prior to applying the plastic material.

In one preferred embodiment, the plastic material is substantially completely wiped off the areas between the depressed areas of a stencil vinyl fine material. However, since the surface of the stencil vinyl fine material is somewhat irregular, not all of the film of plastic material between the areas of depression may be wiped off. In fact, a layer of the plastic material of minimal thickness substantially covers the stencil vinyl composition. Further, the plastic material is caused by the wiping process to penetrate the interstices in the stencil vinyl.

THE SUBSTRATE

The present invention is not believed to be dependent on the substrate employed. Rather, it is believed that any of the substrates normally employed in the surface covering field can be employed in the practice of the present invention.

The substrate or backing sheet should be composed of strong, durable and flexible material. The backing can be woven, felted or a solid sheet of synthetic or natural flexible material. The conventional flexible flooring backing is a web of felted fibers. The felt generally is produced using a Fourdrinier or cylinder paper machine with the thickness of the resulting sheet being that usually used in floor and wall covering, that is, from 0.02 to 0.08 inch. The fibrous material used is normally cellulosic, although other fibers can be used including those of mineral and animal origin. The sources of cellulosic material can include cotton or other rag material, wood pulp including both ground wood and chemical wood pulp, paper, boxes, or mixtures thereof in any proportion. The web can also contain fillers, such as wood flour.

The felt can be strengthened and improved in water resistance by impregnation with a bituminous material. Numerous bituminous materials are well-known as impregnants in the production of printed surface coverings and include asphalts of petroleum or tars and pitch residues of animal or vegetable origin. These materials can be treated to attain the desired physical properties of softening point or viscosity for satisfactory use by such treatment as air blowing, steam distillation, and the like.

The impregnant should be uniformly dispersed throughout the felt sheet. This can be controlled to some extent by the saturating technique through use of pressure rolls in the saturating bath. Where the impregnant is not uniformly dispersed throughout, blistering can frequently occur due to high concentrations of material adjacent to one surface of the felt.

If an impregnated backing sheet is used, it usually is provided with one or more seal coats, such as lacquer, prior to printing a decorative design. The seal coats perform the desirable function of masking the color of the felt and preventing the impregnant from bleeding through and staining the wear layer and, in addition, create a smooth uniform surface suitable as a base for printing.

Felt sheets of the type commonly used as backings for printed surface coverings tend to have minor surface irregularities due to non-uniformities in the felt-making equipment. The sheet also frequently shows a number of small protruding lengths of fibers. The seal coats are designed to hide all these irregularities. The total thickness of seal coats required is normally from about 1 to about 12 mils. This thickness can be created through use of a single thick coating or several superimposed thinner coatings. Using the conventional techniques of coating, such as flexible doctor roller application, the desired thickness is created by use of more than one coating. The use of multiple coatings is also desirable in promoting optimum adhesion of the wear surface layer to the backing, since the seal coat applied directly to the fibrous backing can be designed for optimum sealing against migration of bituminous impregnant and the uppermost seal coat can be designed for optimum adhesion to the polyvinyl chloride surface wear layer.

Certainly, it is not envisioned that the present invention will be limited in any way by the choice of substrate. In fact, although a substrate of some kind is normally required to provide necessary mechanical strength in processing, surface coverings are well known in which a strippable, release carrier is employed. Such a release carrier can then be removed from the surface covering product subsequent to the final fusion procedure. Such a strippable substrate is within the scope of the present invention.

Choices among available substrates, therefore, should be made on some basis such as manufacturing convenience or physical properties of the end product.

THE PVC MATERIAL

The PVC layer is a broad term used to describe any small particle resin material structure that is flowable in the manner of dry sand or a water/sand mix or liquid such as plastisol. One type of granular material is a plastisol slurry wherein the granular material is a plastisol PVC resin material containing a high level of plasticizer. Another type of granular material is the classic dryblend as used in Example 1 wherein the granular material is formed of vinyl resin particles with plasticizer absorbed into the resin. Another type of granular material is a stencil mix of Example 2 wherein the granular material is formed of partially plasticized PVC filled particles. A granular material can be formed of a mixture of dryblend, stencil mix, quartz, and/or other fillers. The composition of the PVC material is not the important feature of its use herein. It is preferred that the PVC material be a granular material formed of small particles and that the particles be colored a number of different colors. A granular material could even be gelled/fused, ground plastisol chips. The PVC layer may be fused plastisol.

THE PLASTIC MATERIAL

The plastic material in one embodiment of the invention makes use of the rheological characteristics of a thixotropic plastic material. With an application methodology such as a double-blade squeegee, a pseudoplastic thixotropic material can be deposited on the fused PVC material, typically in thicknesses exceeding that of normal printing inks. Because of the properties of the material, lateral flow after application can be controlled or substantially eliminated.

A thixotropic material is a material which exhibits dual rheological behavior, that is, they exhibit high viscosity to systems under low shear and low viscosity under high shear.

Fumed and precipitated silicas are probably the most often used thixotropic agents, or thixotropes, although various inorganic and organic materials are known to be operative, including such inorganic materials as very fine particle, organophilic clays and such organic materials as high substituted sorbatols or calcium/organic complexes. Fumed silicate, available commercially from the Degussa Company, under the trade designation Aerosil 200, may be employed. PVC plastisols with relatively low proportions of plasticizer also exhibit thixotropic behavior.

The quantity of such material added to the resin paste system will determine the thixotropic nature of the resulting system, and its viscosities under various rates of shear. Such properties will determine the lateral flow of the plastisol.

Various resinous materials may be employed as the thixotropic material in the present invention and these include virtually any useful resinous plastisols, while polyvinyl chloride resins have been employed with advantage.

It is, however, also within the scope of the invention to employ plastic materials that are Newtonian in behavior or nearly so, or materials whose viscosity increases with increasing shear.

In order to be useful as an abrasion resistive material in the present invention, the thixotropic material should include solid particles having abrasion properties. Such particles may be an inorganic material such as silica quartz or the like. These particles may be clear or slightly translucent. The particles should be of suitable dimension to pass through a No. 10 U.S. Standard seive series mesh, a screen (U.S. Standard) with openings of about two millimeters (2.0 mm) and yet be retained on a No. 200 mesh screen (U.S. Standard), with openings of about seventy microns (70 u.m.). Preferred results, however, have been obtained with particles which would pass through a No. 25 mesh screen (U.S. Standard) with openings of about six hundred microns (600 u.m.) and be retained on a No. 50 mesh screen (U.S. Standard), with openings of about two hundred fifty microns (250 u.m.). The particles of solid material are of a MOHS hardness of 7 to 9, and preferably about 7.

THE ELEMENTS

The elements may be in any shape or pattern. However, geometrics such as repeated patterns of circles, squares, diamonds, and the like have been demonstrated to be effective visually.

The discrete elements may be from about 0.015 inches to about 0.045 inches in depth, preferably from about 80% to about 90% of the thickness of the fused PVC material. Further, it is preferred that such elements cover from about 10% to 50% of the total surface area in the final product in order to provide an effective colored visual. The exact percentage is a function of the decorative material, the visual effect, and the wear resistance desired.

Depending on the type of visual effect desired, the embossing mold may or may not bottom out on the surface of the PVC material layer opposite the substrate. If it is desired to have the stencil vinyl fines appear as discrete particles, the travel of the embossing mold should be set up so that the depressions in the mold do not bottom out. If it is desired to obtain a visual effect in which granular particles are compressed and blended together, the embossing mold should bottom out. When the PVC material is fused before being embossed, the surface of the PVC layer between the depressed areas can be smoothed by bottoming out the embossing roll or left with a matted finish by controlling the travel of the embossing mold so that the depressions in the mold do not bottom out.

Example 1

A dryblend having the following formulation was prepared:

| | | Weight Percent |
|---|---|---|
| PVC Resin | Coarse, Vygen 310 Resin (Manu. by Vygen Corp.) | 68.2 |
| Plasticizer | S-160 Phthalate Plasticizer (Manu. by Monsanto Chemical Co.) | 30.0 |
| Stabilizer | M-275 (Manu. by Argus Chem. Corp.) | 1.8 |
| Pigment | | As Needed |

Four different colored dryblends were prepared and then nottled in the following proportions:

| | |
|---|---|
| Tan | 33.3% |
| Light Blue | 33.3% |
| Brown | 16.2% |
| Red | 16.2% |

The differently colored dryblends were weighed out individually and put into a drum tumbler to interdisperse and blend the mottled colors.

Pevikon S-658 dryblend (Manufactured by Norsk Hydro) has been substituted pound for pound for the course Vygen 310 Resin with good results. Also, a mottled stencil vinyl mix may be used as the PVC resin.

A plastisol used as the thixotropic material was prepared using the following formulation:

| | Weight Percent |
|---|---|
| Plasticizers | |
| Nuoplaz 6000 (Manufactured by Huls America) | 13.44 |
| TXIB (Manufactured by Eastman Chemical Products Inc.) | 13.44 |
| ESO (Manufactured by Argus Chemical Corporation) | 1.57 |
| Stabilizer | |
| Synpron 1522 (Manufactured by Synthetic Products Co.) | 2.35 |
| Air Release Additive | |
| Perenol E-2 (Sold by Blue Bell Chemical Corporation) | 2.02 |
| PVC Resin, Dispersion | |
| Oxy 1734 (Manufactured by Occidental Chemical Corporation) | 19.48 |
| Geon 179 (Manufactured by B. F. Goodrich Chemical Group) | 34.26 |
| PVC Resin, Blending | |
| Geon 213 (Manufactured by B. F. Goodrich Chemical Group) | 13.44 |

To a 30 mil thick backing felt, 3 mils of wet plastisol was applied as a smear coat to tack the dryblend. The dryblend was applied with a screed roll having the nip set to 155 mils, steel-to-steel, with the line running at 23 feet per minute. The oven zones were set at 335, 375, 410, and 450° F. with an air setting of 0.05/0.08, 0.04/0.04, 0.13/0.13, and 0.20/0.09 inches of water. At the exit of the oven and the entrance to the embossing machine, the temperature of the fused granular sheet was 320° F. The embossing roll was run at 50 PSI with the nip set at 65 mils, against the stops. The thixotropic material was applied with a double-blade squeegee coater was 3 mils and $1\frac{3}{8}$ mils thickness or the surface was wiped clean. The thixotropic material was cured and bonded to the layer of fused granular material in a four zone oven set as follows:

| | Zone 1 | Zone 2 | Zone 3 | Zone 4 |
|---|---|---|---|---|
| Temp. Setting (°F.) | 350 | 400 | 400 | 370 |
| Air Setting (Inches of water) | .05/.15 | .15/.15 | .15/.15 | .15/.15 |

Example 2

A stencil vinyl fine composition having the following formulation was prepared:

| | Weight Percent |
|---|---|
| PVC Homopolymer - Vygen 65 (Manu. by Vygen Corp.) | 21.26 |
| Plasticizer - Diisononyl Phthalate | 8.21 |
| Plasticizer/Stabilizer - Epoxidized Soya (Paraplex G-61 Manu. by Rohm and Haas Co.) | 0.33 |
| Stabilizer - Zinc Stearate | 0.15 |
| Lubricant - Stearic Acid | 0.05 |
| Filler - 50 Mesh Limestone | 70.00 |

The stencil vinyl fine composition was laid-up on a lacquer key coated backing felt having a thickness of 32 mils using a peg roller. The stencil vinyl fine composition was leveled with a series of vibrators. The lay-up was heated for about one minute to approximately 325° F. to soften the fines for embossing using 50% on/off (2 secs on/2 secs off) top radiant electric heaters (manufactured by Radiant Heat Enterprises) and bottom platens at 400° F. The softened fines were embossed with an embossing roll over a plain steel bottom roll with the nip set at 50 mils. The feeder was adjusted so that the overall gauge of the felt plus fines was 85 mils immediately after the embossing laminator. The plastisol of Example 1 was applied and cured as in Example 1.

Example 3

Good visual results were also obtained when using the following shear thickening plastisol composition in place of the thixotropic plastisol used in Examples 1 and 2.

| | Weight Percent |
|---|---|
| Borden 260-SS, blending resin (Borden Chemical Co.) | 3.4 |
| Geon 173, dispersion resin (B. F. Goodrich Chemical Group) | 24.1 |
| Borden 440X2, dispersion resin (Borden Chemical Co.) | 11.5 |
| Oxy-6472, dispersion resin (Occidental Chemical Corporation) | 20.6 |
| ESO, plasticizer (Argus Chemical Corporation) | 1.8 |
| TXIB, plasticizer (Eastman Chemical) | 3.6 |
| Nuoplaz 6000, plasticizer (Hüls) | 22.1 |
| Benzoflex, plasticizer (Velsicol Chemical Corporation) | 6.0 |
| Surfynol 104A, surfactant (Air Products & Chemicals, Inc.) | 2.4 |
| Perenol E-2, air release additive (Blue Bell Chemical Corporation) | 1.8 |
| Synpron 1522, stabilizer (Synthetic Products Co.) | 2.7 |

Example 4

Similar results to those of Example 3 were obtained using the following plastisol formulation:

| | Weight Percent |
|---|---|
| Borden 260-SS, blending resin (Borden Chemical Co.) | 2.9 |
| Geon 173, dispersion resin (B. F. Goodrich) | 19.7 |
| Borden, 440X2, dispersion resin (Borden Chemical Co.) | 24.6 |
| Oxy-6472, dispersion resin (Occidental Chemical Corporation) | 19.7 |
| ESO, plasticizer, plasticizer (Argus Chemical Corporation) | 0.7 |
| Nuoplaz 6000 (Hüls) | 25.7 |
| Synpron 11363 stabilizer (Synthetic Products Co.) | 2.7 |
| BYK 4015, surfactant (Chemie U.S.A.) | 4.0 |

What is claimed is:

1. A decorative surface covering product comprising:

(a) a first layer of fused PVC material, and (b) a second layer of cured transparent or translucent plastic material substantially covering said first layer, said second layer having an element extending into said first layer.

2. The decorative surface covering product of claim 1 wherein the PVC material is a granular material prior to being fused.

3. The decorative surface covering product of claim 2 wherein the granular material is selected from the group consisting of dryblend, stencil vinyl fines, and chips of fused PVC.

4. The decorative surface covering product of claim 2 wherein the granular material appears through the second layer as particles of differing colors.

5. The decorative surface covering product of claim 1 wherein the second layer includes a plurality of discrete elements extending into the first layer.

6. The decorative surface covering product of claim 5 wherein in the surface of the second layer opposite the discrete elements projects above the plane of the surface of the second layer which is opposite the areas between the discrete elements.

7. The decorative surface covering product of claim 5 wherein the surface of the second layer opposite the areas between the discrete elements projects above the plane of the surface of the second layer opposite the discrete elements.

8. The decorative surface covering product of claim 5 wherein the plastic material is transparent and the discrete protruding elements are arranged in a dot pattern design providing the decorative surface of the covering product with a lenticular effect.

9. The decorative surface covering product of claim 5 wherein the portion of the second layer between the elements has minimal thickness.

10. The decorative surface covering product of claim 1 wherein the plastic material is translucent and includes a plurality of discrete elements extending completely into the first layer, the discrete elements being arranged in a dot pattern design providing the decorative surface of the covering product with a discrete colored dot pattern of a contrasting shade of color to the color of the decorative surface of the covering product not above a discrete protruding elements.

11. The decorative surface covering product of claim 1 wherein the second layer includes a plurality of discrete elements having a cross-sectional shape selected from the group consisting of circular, rectangular, regular polygonal and cross-bar.

12. The decorative surface covering product of claim 11 wherein the cross-sectional area of the elements is substantially constant.

13. The decorative surface covering product of claim 1 wherein the depth of the element is about 80% to 90% of the thickness of the first layer.

14. The decorative surface covering product of claim 1 wherein the element is about 0.015 to 0.045 inches in depth.

15. The decorative surface covering product of claim 1 wherein the cross-sectional area of the element at its interface with the surface of the second layer adjacent the first layer is about 10 to 50% of the surface area of the decorative surface covering product.

16. The decorative surface covering product of claim 1 wherein the plastic material contains solid particles.

17. The decorative surface covering product of claim 1 wherein the plastic material is a plastisol.

18. The decorative surface covering product of claim 1 wherein the plastic material is translucent.

19. The decorative surface covering product of claim 1 wherein the surface of the second layer opposite the element extending into the first layer is an exposed wear surface.

* * * * *

UNITED STATES PATENT AND TRADEMARK OFFICE

CERTIFICATE OF CORRECTION

PATENT NO. : 5,102,716

DATED : April 7, 1992

INVENTOR(S) : Richard H. Balmer et al.

It is certified that error appears in the above-identified patent and that said Letters Patent is hereby corrected as shown below:

On the title page:

"Continuation of Ser. No. 231,366" should read --Continuation-in-part of Ser. No. 231,366--.

Column 1, line 9, the number "4,903,443" should read --4,983,443--.
Column 7, line 17, the word "nottled" should read --mottled--.
Column 8, line 2, the word "was" should read --at--.
Column 8, line 2, the number "1-2/3" should read --1-1/2--.

Signed and Sealed this

First Day of June, 1993

Attest:

MICHAEL K. KIRK

Attesting Officer

*Acting Commissioner of Patents and Trademarks*